(12) United States Patent
Tamai et al.

(10) Patent No.: US 8,872,466 B2
(45) Date of Patent: Oct. 28, 2014

(54) SYNCHRONOUS-MACHINE STARTING DEVICE

(75) Inventors: Shinzo Tamai, Minato-ku (JP); Hisanori Taguchi, Minato-ku (JP); Akinobu Ando, Minato-ku (JP); Yasuhiko Hosokawa, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 120 days.

(21) Appl. No.: 13/391,947

(22) PCT Filed: Aug. 24, 2009

(86) PCT No.: PCT/JP2009/064695
§ 371 (c)(1),
(2), (4) Date: Feb. 23, 2012

(87) PCT Pub. No.: WO2011/024247
PCT Pub. Date: Mar. 3, 2011

(65) Prior Publication Data
US 2012/0161688 A1  Jun. 28, 2012

(51) Int. Cl.
*H02P 1/46* (2006.01)
*H02P 1/52* (2006.01)
*H02M 5/27* (2006.01)

(52) U.S. Cl.
CPC . *H02P 1/52* (2013.01); *H02M 5/272* (2013.01)
USPC ............. 318/721; 318/62; 318/690; 318/700; 318/85; 310/12.18

(58) Field of Classification Search
USPC ...................... 318/721, 690, 62, 85, 700, 705; 310/12.18
See application file for complete search history.

(56) References Cited

U.S. PATENT DOCUMENTS 5,493,485 A * 2/1996 Okado ........................ 363/56.01
6,462,491 B1  10/2002 Iijima et al.
(Continued)

FOREIGN PATENT DOCUMENTS

JP   6 253580   9/1994
JP   6 335297   12/1994
(Continued)

OTHER PUBLICATIONS

Decision to Grant Patent mailed Mar. 4, 2014, in Japanese Patent Application No. 2011-528530 (with English-language translation).

(Continued)

*Primary Examiner* — Eduardo Colon Santana
*Assistant Examiner* — Iftekhar Mustafa
(74) *Attorney, Agent, or Firm* — Oblon, Spivak, McClelland, Maier & Neustadt, L.L.P.

(57) ABSTRACT

A synchronous-machine starting device includes an electric power conversion unit for converting supplied electric power into AC power for supply to the armature of the synchronous machine, a rotor position detection unit for detecting a position of the rotor of the synchronous machine based on an AC voltage in the armature of the synchronous machine detected by an AC voltage detection unit, an electric power conversion control unit for controlling the electric power conversion unit based on the position of the rotor detected by the rotor position detection unit, and an abnormality detection unit detecting a rotation abnormality of the synchronous machine based on the AC voltage detected by the AC voltage detection unit after supply of the field current to the rotor of the synchronous machine is started.

11 Claims, 6 Drawing Sheets

(56) References Cited

U.S. PATENT DOCUMENTS

| | | |
|---|---|---|
| 2007/0236167 A1 | 10/2007 | Tomigashi |
| 2011/0181220 A1 | 7/2011 | Tamai et al. |
| 2011/0254491 A1 | 10/2011 | Tamai et al. |
| 2011/0298406 A1 | 12/2011 | Tamai et al. |
| 2012/0051103 A1 | 3/2012 | Hosokawa et al. |

FOREIGN PATENT DOCUMENTS

| | | | |
|---|---|---|---|
| JP | 10 23783 | | 1/1998 |
| JP | 2000 350489 | | 12/2000 |
| JP | 2004 229360 | | 8/2004 |
| JP | 2005 57922 | | 3/2005 |
| JP | 2005-057922 | * | 3/2005 |
| JP | 2006-271038 | * | 10/2006 |
| JP | 2006 271038 | | 10/2006 |
| JP | 2007-49835 | | 2/2007 |
| JP | 2007 282389 | | 10/2007 |
| JP | 2007-282389 | * | 10/2007 |

OTHER PUBLICATIONS

International Search Report Issued Nov. 24, 2009 in PCT/JP09/64695 Filed Aug. 24, 2009.

U.S. Appl. No. 13/878,836, filed Apr. 11, 2013, Tamai, et al.

* cited by examiner

SYNCHRONOUS-MACHINE STARTING DEVICE

TECHNICAL FIELD

The present invention relates to a synchronous-machine starting device, and particularly to a synchronous-machine starting device that detects the position of a rotor of a synchronous machine based on the voltage in an armature of the synchronous machine.

BACKGROUND ART

Synchronous-machine starting devices for starting synchronous machines such as electric generators and electric motors have been developed. A synchronous-machine starting device is used for gas turbine combined cycle power generation, for example. A synchronous-machine starting device includes, for example, an inverter that supplies AC power to a synchronous machine, and detects the position of a rotor of the synchronous machine and controls a firing phase of a thyristor in the inverter based on the detected rotor position.

Conventionally, the synchronous-machine starting device uses a mechanical distributor detecting the position of a rotor of a synchronous machine by means of a proximity switch or the like. The mechanical distributor, however, is liable to be broken and influenced by noise due to many wires.

An example of the synchronous-machine starting device for eliminating the need for such a mechanical distributor is disclosed in Japanese Patent Laying-Open No. 2006-271038 (Patent Literature 1). Specifically, this synchronous-generator starting device includes an externally communicated converter formed of externally communicated devices such as thyristors, and an externally communicated inverter formed of externally communicated devices such as thyristors for converting DC (direct current) power obtained by the converter into AC (alternating current) power, and starts a synchronous generator with AC power obtained by the inverter. The synchronous-generator starting device includes an AC voltage detector for detecting a voltage of an armature terminal of the synchronous generator, an AC current detector for detecting an inverter output current flown from the inverter to an armature of the synchronous generator, an induction voltage operating circuit calculating, from the detected value of the inverter AC current from the output current detector and from a first estimated value of the synchronous generator's rotational speed, an in-phase component and an orthogonal component, relative to a first reference phase, of an induction voltage induced to an armature winding of the synchronous generator by a field current of the synchronous generator, and a PLL circuit outputting a second reference phase and a second estimated value of the synchronous generator's rotational speed that cause the orthogonal component of the first reference phase of the induction voltage from the induction voltage operating circuit to be zero. This synchronous-generator starting device generates a gate pulse of the inverter of a predetermined control advance angle, based on the second reference phase that is output from the PLL circuit, and applies the second reference phase to the first reference phase of the induction voltage operating circuit, and applies the second estimated value of the synchronous generator's rotational speed to the first estimated value of the synchronous generator's rotational speed of the induction voltage operating circuit.

CITATION LIST

Patent Literature

PTL 1: Japanese Patent Laying-Open No. 2006-271038

SUMMARY OF INVENTION

Technical Problem

In the synchronous-machine starting device disclosed in PTL 1, however, when the magnetic field in the rotor of the synchronous machine and the firing phase of the thyristor are out of phase due to some reason, normal torque cannot be applied to the synchronous machine, so that rotation of the synchronous machine cannot be accelerated.

Typically, in the synchronous machine, during initial rotation before acceleration by the synchronous-machine starting device, a constant field current is flown through a field winding of the rotor, so that a constant fixed magnetic field is produced. Here, heat generated in the field winding by the field current is air-cooled by rotation of the rotor, however, if the state where a constant field current is flown continues with the number of revolutions of the synchronous machine not increased as described above, the field winding may rise in temperature, and the synchronous machine may be broken.

The present invention was made to solve the above-described problems, and has an object to provide a synchronous-machine starting device capable of stably starting a synchronous machine by detecting a rotation abnormality of the synchronous machine.

Solution to Problem

A synchronous-machine starting device according to an aspect of the present invention is a synchronous-machine starting device for starting a synchronous machine including an armature for generating a rotating magnetic field and a rotor generating a fixed magnetic field by being supplied with a field current, including an electric power conversion unit for converting supplied electric power into AC power for supply to the armature of the synchronous machine, an AC voltage detection unit for detecting an AC voltage in the armature of the synchronous machine, a rotor position detection unit for detecting a position of the rotor of the synchronous machine based on the AC voltage detected by the AC voltage detection unit, an electric power conversion control unit for controlling the electric power conversion unit based on the position of the rotor detected by the rotor position detection unit, and an abnormality detection unit detecting a rotation abnormality of the synchronous machine based on the AC voltage detected by the AC voltage detection unit after supply of the field current to the rotor of the synchronous machine is started.

Preferably, the abnormality detection unit detects the rotation abnormality of the synchronous machine based on the number of times that a level of the AC voltage in the armature of the synchronous machine attains a predetermined value in the whole or part of a period from a time when supply of the field current to the rotor of the synchronous machine is started to a time when supply of the AC power to the armature of the synchronous machine by the electric power conversion unit is started.

Preferably, based on an estimated phase representing the position of the rotor, an estimated rotational speed of the rotor, and the AC voltage detected by the AC voltage detection unit, the rotor position detection unit calculates an error of the estimated phase, and calculates the estimated phase and the estimated rotational speed based on the error of the phase as calculated, and the abnormality detection unit detects the rotation abnormality of the synchronous machine based on the estimated rotational speed calculated by the rotor position detection unit after a lapse of a predetermined time since a time when supply of the AC power to the armature of the synchronous machine by the electric power conversion unit is started.

Preferably, the abnormality detection unit detects the rotation abnormality of the synchronous machine based on an amplitude of the AC voltage detected by the AC voltage detection unit after a lapse of a predetermined time since a time when supply of the AC power to the armature of the synchronous machine by the electric power conversion unit is started.

Advantageous Effects of Invention

In accordance with the present invention, a synchronous machine can stably be started by detecting a rotation abnormality of the synchronous machine.

DESCRIPTION OF EMBODIMENTS

Figure 1:
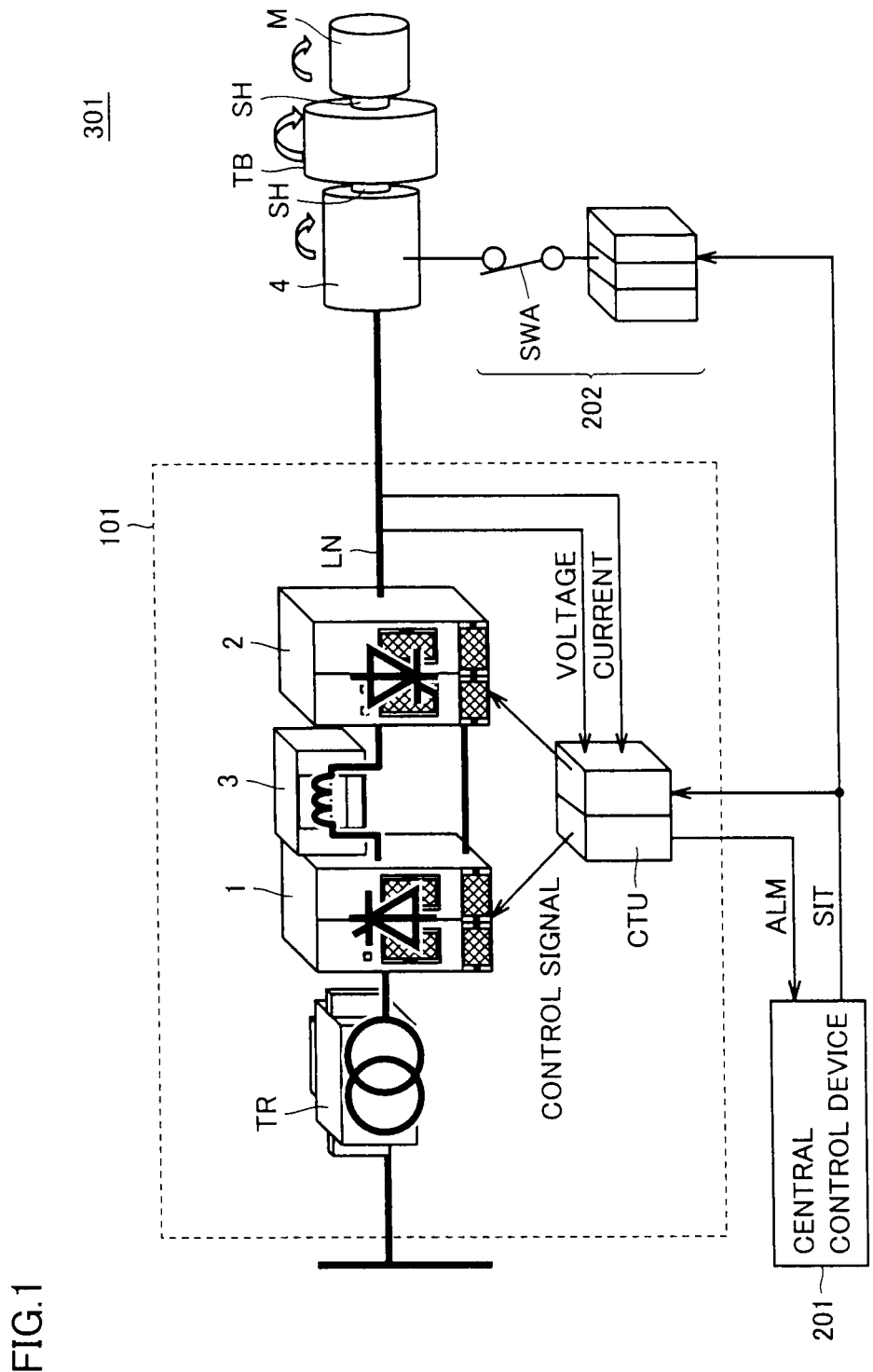
FIG. 1 is a diagram showing a configuration of a synchronous machine system according to a first embodiment of the present invention.

Embodiments of the present invention will hereinafter be described with the drawings. The same or corresponding components in the drawings are denoted by the same reference characters, and a description thereof will not be repeated.

First Embodiment

Figure 2:
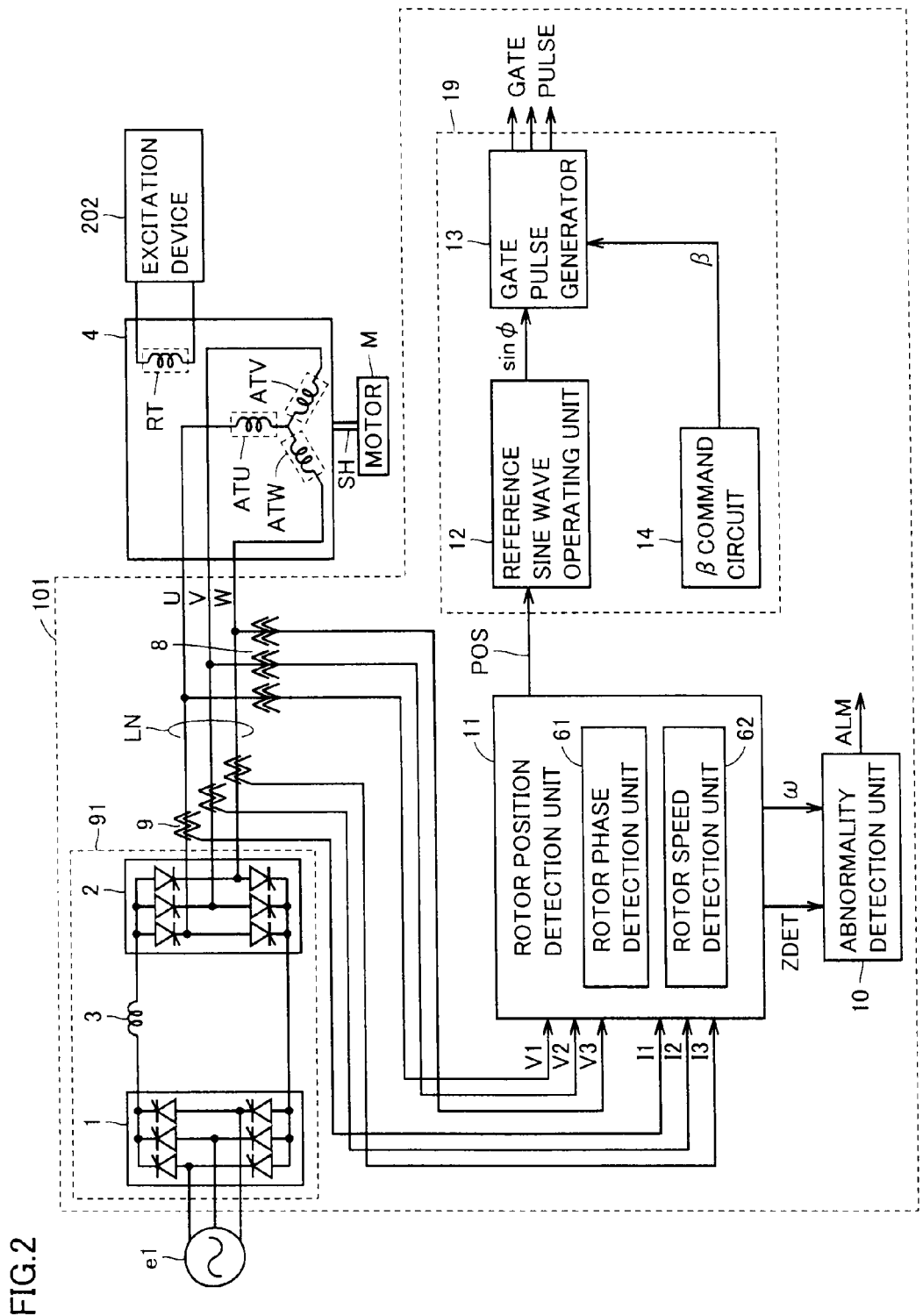
FIG. 2 is a diagram showing in detail a configuration of a synchronous-machine starting device according to the first embodiment of the present invention.

FIG. 1 is a diagram showing a configuration of a synchronous machine system according to a first embodiment of the present invention. FIG. 2 is a diagram showing in detail a configuration of a synchronous-machine starting device according to the first embodiment of the present invention.

Referring to FIG. 1, a synchronous machine system 301 is a power generation system, for example, and includes a central control device 201, an excitation device 202, a synchronous-machine starting device 101, a synchronous machine 4, a turbine TB, and a motor M.

A synchronous machine 4 and a motor M are connected via a shaft SH. Synchronous machine 4 is for example a synchronous generator or synchronous motor, and as shown in FIG. 2, has armatures ATU, ATV, ATW as stators and a rotor (magnetic field) RT. Armature windings and a field winding are wound around these stators and rotor, respectively.

Synchronous-machine starting device 101 supplies AC power to the armature windings on the stators of synchronous machine 4, thereby generating a rotating magnetic field at the stators of synchronous machine 4. Excitation device 202 supplies a field current to the field winding on the rotor of synchronous machine 4, thereby generating a fixed magnetic field at the rotor of synchronous machine 4. The stators of synchronous machine 4 rotate by these rotating magnetic field and fixed magnetic field.

Motor M rotates at a predetermined speed while synchronous machine 4 is in a standby state. This rotational speed is a low speed, and several rpm for example. In contrast, the rotational speed for a normal operation is 3000 rpm to 3600 rpm. The voltage in each armature of synchronous machine 4 at start-up is considerably low, which is, for example, ¹⁄₁₀₀₀ of the rated voltage in a steady state.

The operation of synchronous machine system 301 will be described briefly. First, central control device 201 provides a start-up command for excitation device 202, that is, outputs a control signal SIT indicating a start-up command for excitation device 202, in the state where synchronous machine 4 and turbine TB rotate at a low speed with rotation of motor M while synchronous machine 4 is in a standby state.

Excitation device 202 includes a field switch SWA, and upon receipt of control signal SIT indicating a start-up command for excitation device 202 from central control device 201, turns on field switch SWA to supply a field current to the field winding of the rotor of synchronous machine 4.

Central control device 201 provides a start-up command for synchronous-machine starting device 101, that is, outputs control signal SIT indicating a start-up command for synchronous-machine starting device 101 in the state where a field current is being supplied to the rotor of synchronous machine 4.

Upon receipt of control signal SIT indicating a start-up command for synchronous-machine starting device 101 from central control device 201, synchronous-machine starting device 101 accelerates synchronous machine 4 and turbine TB to a predetermined rotational speed. More specifically, synchronous-machine starting device 101 converts electric power supplied from the outside by a transformer TR and supplies AC power to each armature of synchronous machine 4 based on the converted electric power, thereby accelerating rotation of synchronous machine 4 and turbine TB.

When the rotational speed of synchronous machine 4 and turbine TB reaches a predetermined value by synchronous-machine starting device 101, turbine TB rotates synchronous machine 4 at a higher speed with energy such as firepower.

Moreover, when a start-up command is provided to excitation device 202 from central control device 201, synchronous-machine starting device 101 starts an abnormality detection operation, and if a rotation abnormality of synchronous machine 4 is detected, outputs an alarm signal ALM to central control device 201.

Upon receipt of alarm signal ALM from synchronous-machine starting device 101, central control device 201 performs suitable processing, such as stopping excitation device 202, synchronous-machine starting device 101, synchronous machine 4, turbine TB, and motor M.

Referring to FIG. 2, synchronous-machine starting device 101 includes an electric power conversion unit 91, an AC voltage detector 8, an AC current detector 9, an abnormality detection unit 10, a rotor position detection unit 11, and an inverter control unit (electric power conversion control unit) 19. Electric power conversion unit 91 includes a converter 1, an inverter 2, and a DC reactor 3. Inverter control unit 19 includes a reference sine wave operating unit 12, a gate pulse generator 13, and a command circuit 14.

Converter 1 is formed of a plurality of devices such as thyristors, and converts AC power from an AC power supply e1 into DC power.

Inverter 2 is formed of a plurality of devices such as thyristors, and converts the DC power obtained by converter 1 into AC power and supplies the AC power to armatures ATU, ATV, ATW of synchronous machine 4 to thereby drive synchronous machine 4.

Converter 1 and inverter 2 are connected via DC reactor 3. The AC side of inverter 2 is connected to armatures ATU, ATV, ATW of synchronous machine 4.

AC voltage detector 8 detects a three-phase AC voltage supplied to armatures ATU, ATV, ATW of synchronous machine 4, and outputs detected voltage values V1, V2, V3 to rotor position detection unit 11. For example, AC voltage detector 8 detects a line voltage of AC voltages in armatures ATU, ATV, ATW of synchronous machine 4. If two line AC voltages, such as an AC voltage between the U phase and the V phase and an AC voltage between the V phase and the W phase, are detected, the AC voltage in the U, V and W phases can be obtained by calculation. Conversion from line voltages to phase voltages is performed in AC voltage detector 8 or rotor position detection unit 11.

AC current detector 9 detects a three-phase AC current supplied to armatures ATU, ATV, ATW of synchronous machine 4, and outputs detected current values I1, I2, I3 to rotor position detection unit 11.

Rotor position detection unit 11 detects the position (phase) of the rotor of synchronous machine 4 based on the detected values received from AC voltage detector 8 and those from AC current detector 9, and outputs a position signal POS representing the position of the rotor of synchronous machine 4 to inverter control unit 19.

Inverter control unit 19 controls inverter 2 based on position signal POS received from rotor position detection unit 11, thereby generating a rotating magnetic field at armatures ATU, ATV, ATW of synchronous machine 4.

In inverter control unit 19, reference sine wave operating unit 12 outputs a reference sine wave sin φ based on position signal POS received from rotor position detection unit 11.

β command circuit 14 calculates a control-advance-angle command value β and outputs the value to gate pulse generator 13.

Gate pulse generator 13 outputs a gate pulse to respective devices in inverter 2 based on reference sine wave sin φ received from reference sine wave operating unit 12 and control-advance-angle command value β received from β command circuit 14.

Based on an estimated phase. i.e., a reference phase φ, which will be described later, representing the position of the rotor of synchronous machine 4, detected voltage values V1, V2, V3 received from AC voltage detector 8, and detected current values I1, I2, I3 received from AC current detector 9, rotor position detection unit 11 calculates an error of the estimated phase, and calculates the estimated phase, i.e., reference phase φ, which will be described later, based on the calculated phase error. Rotor position detection unit 11 performs feedback calculation of outputting position signal POS obtained from the calculated estimated phase and newly calculating an error of the estimated phase based on the calculated estimated phase, detected voltage values V1, V2, V3 newly received from AC voltage detector 8, and detected current values I1, I2. I3 newly received from AC current detector 9.

Abnormality detection unit 10 detects a rotation abnormality of synchronous machine 4 based on AC voltages detected by AC voltage detector 8 after the supply of a field current from excitation device 202 to rotor RT of synchronous machine 4 is started.

Figure 3:
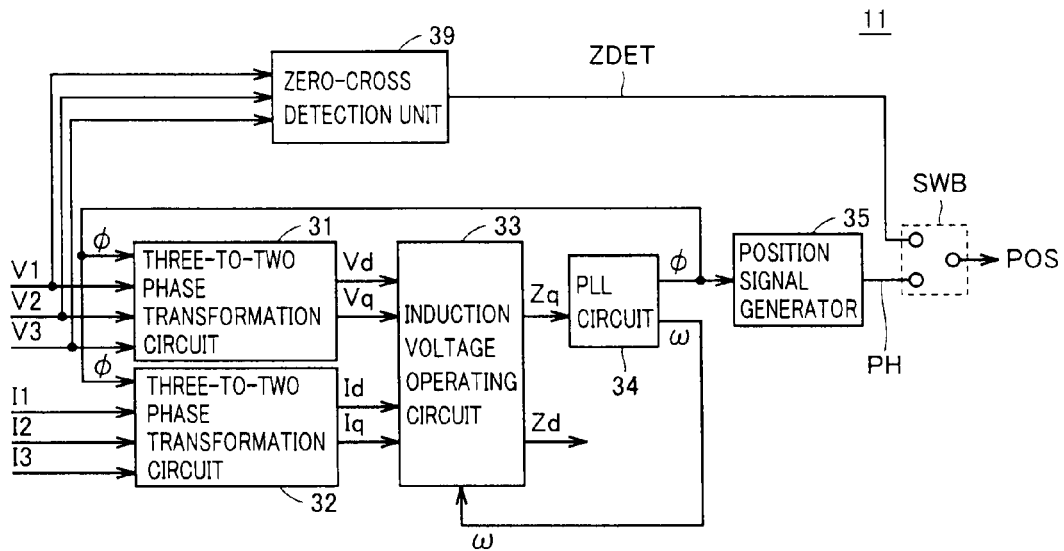
FIG. 3 is a diagram showing a configuration of a rotor position detection unit 11.

FIG. 3 is a diagram showing a configuration of rotor position detection unit 11.

Referring to FIG. 3, rotor position detection unit 11 includes a zero-cross detection unit (level monitoring unit) 39, three-to-two phase transformation circuits 31 and 32, an induction voltage operating circuit 33, a PLL circuit 34, position signal generator 35, and a switch SWB.

Zero-cross detection unit 39 performs zero-cross detection for the AC voltage in each armature of synchronous machine 4 based on detected voltage values V1, V2. V3 received from AC voltage detector 8. Specifically, zero-cross detection unit 39 detects timing when the level of AC voltage in each armature of synchronous machine 4 attains zero volts, for example, and outputs a pulsed detection signal ZDET indicating the detected timing to switch SWB.

Based on reference phase φ, three-to-two phase transformation circuit 31 performs three-to-two phase transformation (d-q transformation) of detected voltage values V1, V2, V3 received from AC voltage detector 8.

Based on reference phase φ, three-to-two phase transformation circuit 32 performs three-to-two phase transformation (d-q transformation) of detected current values I1, I2, I3 received from AC current detector 9.

Induction voltage operating circuit 33 calculates an induction voltage induced to each armature of synchronous machine 4, based on voltage values Vd and Vq generated through transformation by three-to-two phase transformation circuit 31 as well as current values Id and Iq generated through transformation by three-to-two phase transformation circuit 32.

In order to carry out coordinate transformation, namely three-to-two phase transformation of the voltage and the current by three-to-two phase transformation circuits 31 and 32, a reference phase which is synchronous with rotation of the rotor of synchronous machine 4 is necessary. Where no position sensor such as a mechanical distributor is present, however, this signal is not directly obtained.

In the synchronous-machine starting device according to the first embodiment of the present invention, three-to-two phase transformation circuits 31 and 32 are thus provided with an initial value of reference phase φ at start-up of synchronous-machine starting device 101 to perform coordinate transformation.

Then, induction voltage operating circuit 33 calculates an induction voltage of each armature on the d-axis (in-phase component)–q-axis (orthogonal component) of synchronous machine 4, based on voltage values and current values on the d-q axis that are generated through transformation by three-to-two phase transformation circuits 31 and 32. In order to calculate the induction voltage, rotational speed ω is necessary. Here, since there is no position sensor, an initial value of rotational speed ω of synchronous machine 4 is provided to induction voltage operating circuit 33 at start-up of synchronous-machine starting device 101.

If a q-axis component Zq of the induction voltage calculated by induction voltage operating circuit 33, namely an orthogonal component relative to reference phase φ, is not zero, the result of calculation is out of phase with reference phase φ. This q-axis component Zq of the induction voltage corresponds to an error of the estimated phase of the rotor in synchronous machine 4. In view of this, PLL circuit 34 is provided that performs control so that q-axis component Zq of the induction voltage is zero. PLL circuit 34 calculates rotational speed ω, namely an estimated rotational speed of the rotor of synchronous machine 4 and reference phase φ, namely an estimated phase of the rotor of synchronous machine 4 that allow q-axis component Zq of the induction voltage to be zero.

Reference phase φ calculated by PLL circuit 34 is fed back to three-to-two phase transformation circuits 31 and 32, and is also output to position signal generator 35. A phase signal PH having a pulsed waveform similar to that of a mechanical distributor is output from position signal generator 35 to switch SWB. Three-to-two phase transformation circuits 31 and 32 thereafter perform three-to-two phase transformation based on reference phase φ from PLL circuit 34.

Rotational speed ω calculated by PLL circuit 34 is supplied to induction voltage operating circuit 33. Induction voltage operating circuit 33 thereafter calculates an induction voltage (in-phase component) Zd and an induction voltage (orthogonal component) Zq based on rotational speed ω from PLL circuit 34.

Switch SWB outputs either of detection signal ZDET received from zero-cross detection unit 39 and phase signal PH received from position signal generator 35, to inverter control unit 19 as position signal POS representing the position of the rotor of synchronous machine 4.

While it has been described that, in the synchronous-machine starting device according to the first embodiment of the present invention, rotor position detection unit 11 is configured to calculate an error of an estimated phase based on the estimated phase representing the position of the rotor of synchronous machine 4, detected voltage values V1. V2, V3 received from AC voltage detector 8, and detected current values I1. I2, I3 received from AC current detector 9, this is not a limitation. Rotor position detection unit 11 may be configured to calculate an error of an estimated phase based on the estimated phase representing the position of the rotor of synchronous machine 4 and detected voltage values V1, V2, V3 received from AC voltage detector 8.

Moreover, while it has been described that, in the synchronous-machine starting device according to the first embodiment of the present invention, PLL circuit 34 is configured to calculate rotational speed ω and reference phase φ only based on q-axis component Zq of the induction voltage, this is not a limitation. PLL circuit 34 may be configured to calculate rotational speed ω and reference phase φ based on q-axis component Zq and d-axis component Zd. Such a configuration enables more correct calculation.

Figure 4:
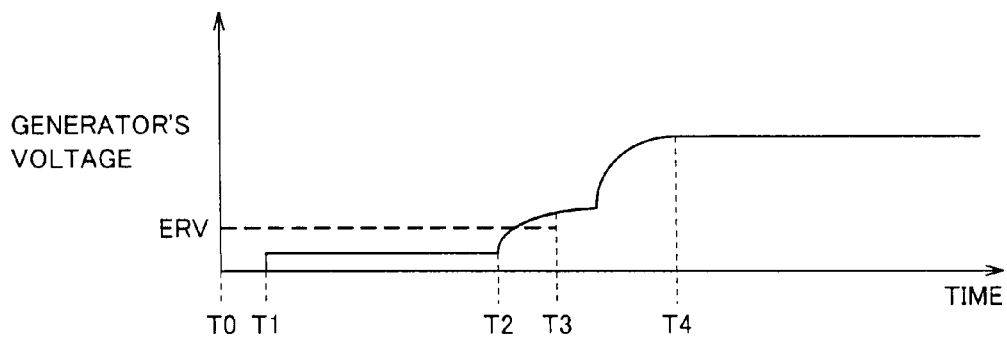
FIG. 4 is a diagram showing a root-mean-square value of an AC voltage in an armature of a synchronous machine according to the first embodiment of the present invention.

FIG. 4 is a diagram showing a root-mean-square value of an AC voltage in each armature of the synchronous machine according to the first embodiment of the present invention.

Referring to FIG. 4, first, at time T0, synchronous machine 4 and turbine TB are rotating at a low speed with rotation of motor M.

Next, at time T1, central control device 201 provides a start-up command for excitation device 202. Upon receipt of the start-up command from central control device 201, excitation device 202 turns on field switch SWA, and supplies a constant field current to the field winding of the rotor of synchronous machine 4. Then, an AC voltage of low amplitude is induced at each armature of synchronous machine 4 since the rotor of synchronous machine 4 is being rotated by motor M at a low speed.

Switch SWB outputs detection signal ZDET received from zero-cross detection unit 39 to inverter control unit 19 as position signal POS. Moreover, abnormality detection unit 10 performs abnormality detection based on zero-cross points. Specifically, abnormality detection unit 10 detects a rotation abnormality of synchronous machine 4 based on the number of times that the level of AC voltage in each armature of synchronous machine 4 attains a predetermined value, for example, zero volts, in the whole or part of a period from a time (time T1) when supply of a field current to the rotor of synchronous machine 4 is started to a time (time T2) when supply of AC power to each armature of synchronous machine 4 by electric power conversion unit 91 is started.

Next, at time T2, central control device 201 provides a start-up command to synchronous-machine starting device 101. Upon receipt of the start-up command from central control device 201, synchronous-machine starting device 101 accelerates synchronous machine 4 and turbine TB to a predetermined rotational speed. With this increase in rotational speed of synchronous machine 4, the AC voltage in each armature of synchronous machine 4 increases in amplitude.

Then, switch SWB outputs phase signal PH received from position signal generator 35 to inverter control unit 19 as position signal POS.

Next, at time T3, abnormality detection unit 10 performs abnormality detection based on rotational speed ω. Specifically, abnormality detection unit 10 detects a rotation abnormality of synchronous machine 4 based on rotational speed ω calculated by rotor position detection unit 11 after a lapse of a predetermined time since the time (time T2) when supply of AC power to each armature of synchronous machine 4 by electric power conversion unit 91 is started.

Next, at time T4, when the rotation of synchronous machine 4 and turbine TB attains a predetermined speed, turbine TB rotates synchronous machine 4 at a higher speed with energy such as firepower. Excitation device 202 maintains the level of AC voltage in each armature of synchronous machine 4 constant by adjusting the field current.

Figure 5:
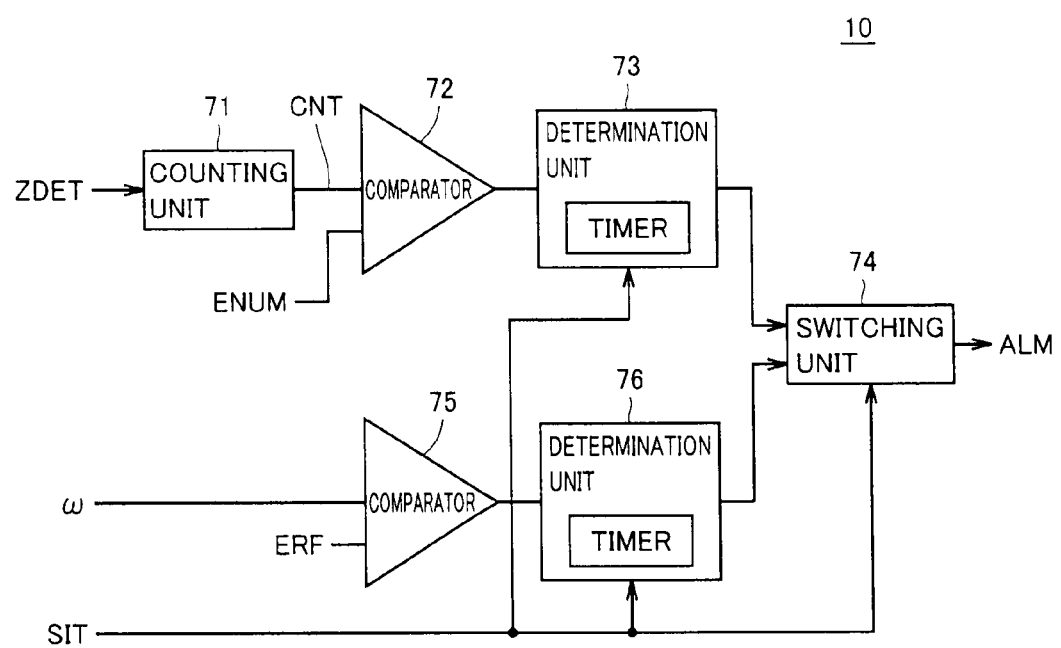
FIG. 5 is a diagram showing a configuration of an abnormality detection unit in the synchronous machine system according to the first embodiment of the present invention.

FIG. 5 is a diagram showing a configuration of the abnormality detection unit in the synchronous machine system according to the first embodiment of the present invention.

Referring to FIG. 5, abnormality detection unit 10 includes a counting unit 71, a comparator 72, a determination unit 73, a switching unit 74, a comparator 75, and a determination unit 76.

Counting unit 71 counts the number of pulses of detection signal ZDET received from zero-cross detection unit 39, and outputs a count signal CNT representing the number of times that the level of AC voltage in each armature of synchronous machine 4 attains zero volts, to comparator 72.

Comparator 72 compares the number of times indicated by count signal CNT received from counting unit 71 with a reference number of times ENUM, and when the reference number of times ENUM is larger, for example, outputs a signal of a logic level indicating that it is abnormal, and when the reference number of times ENUM is smaller, outputs a signal of a logic level indicating that it is normal.

Determination unit 73 has a timer, and outputs a signal of a logic level indicating that it is normal as a determination signal, irrespective of a signal received from comparator 72, until the time set for this timer lapses since the time (time T1 in FIG. 4) when control signal SIT indicating the start-up command for excitation device 202 is received from central control device 201. Then, determination unit 73 outputs the signal received from comparator 72 as it is to switching unit 74 as a determination signal after a lapse of the time set for this timer since the time when the start-up command for excitation device 202 is received from central control device 201.

Comparator 75 compares rotational speed ω received from rotor position detection unit 11 with a reference speed ERF, and when reference speed ERF is higher, for example, outputs a signal of a logic level indicating that it is abnormal, and when reference speed ERF is lower, outputs a signal of a logic level indicating that it is normal.

Determination unit 76 has a timer, and outputs a signal of a logic level indicating that it is normal as a determination signal, irrespective of a signal received from comparator 75, until the time set for this timer lapses (time T3 in FIG. 4) since the time (time T2 in FIG. 4) when control signal SIT indicating the start-up command for synchronous-machine starting device 101 is received from central control device 201. Then, determination unit 76 outputs the signal received from comparator 75 as it is to switching unit 74 as a determination signal after a lapse of the time set for this timer since the time when control signal SIT indicating the start-up command for synchronous-machine starting device 101 is received from central control device 201.

Switching unit 74, for example, outputs the determination signal received from determination unit 73 to central control device 201 before receiving the start-up command for synchronous-machine starting device 101 from central control device 201, and outputs the determination signal received from determination unit 76 to central control device 201 after receiving the start-up command for synchronous-machine starting device 101 from central control device 201.

While synchronous machine 4 is on standby, the voltage in each armature of synchronous machine 4 is very small as described above. Estimation accuracy of the induction voltage by induction voltage operating circuit 33 is thus low, and therefore, switch SWB outputs detection signal ZDET received from zero-cross detection unit 39 to inverter control unit 19 as position signal POS. That is, while synchronous machine 4 is on standby, the interval of zero-cross points is constant since the rotor of synchronous machine 4 rotates at a predetermined speed with the rotation of motor M. Therefore, in the synchronous-machine starting device according to the first embodiment of the present invention, zero-cross points are detected and thus the frequency of AC voltage in each armature of synchronous machine 4 is measured in a simple manner while synchronous machine 4 is on standby, thereby detecting a rotation abnormality of synchronous machine 4.

Accordingly, even if the voltage in each armature of synchronous machine 4 is very small so that the position of the rotor of synchronous machine 4 cannot be presumed, the rotational speed of the rotor of synchronous machine 4 can be estimated, and a rotation abnormality of synchronous machine 4 can be detected. Moreover, a defect, such as a failure in supply of a field current to the rotor of synchronous machine 4 due to a failure of field switch SWA or the like, can be found in a stage before synchronous-machine starting device 101 is provided with a start-up command.

If detected voltage values V1, V2, V3 are not output due to a failure of AC voltage detector 8, zero-cross detection unit 39 will be unable to detect zero-cross points. In the synchronous-machine starting device according to the first embodiment of the present invention, however, such an abnormality can also be detected by abnormality detection unit 10.

Moreover, the configuration of detecting an abnormality based on rotational speed ω after inverter 2 starts power supply to each armature of synchronous machine 4 enables correct and quick abnormality detection relative to the method of detecting an abnormality based on zero-cross points.

It is noted that it has been described that, in the synchronous-machine starting device according to the first embodiment of the present invention, abnormality detection unit 10 is configured to detect a rotation abnormality of synchronous machine 4 based on the number of times that the level of AC voltage in each armature of synchronous machine 4 attains a predetermined value, for example, zero volts, in the whole or part of a period from time T1 to time T2, however, this is not a limitation. Abnormality detection unit 10 may be configured to detect a rotation abnormality of synchronous machine 4 based on the number of times that the level of AC voltage in each armature of synchronous machine 4 attains a predetermined value, for example, zero volts, in the whole or part of a period from time T1 to time T3.

Another embodiment of the present invention will now be described with the drawings. In the drawings, the same or corresponding components are denoted by the same reference characters, and a description thereof will not be repeated.

Second Embodiment

The present embodiment relates to a synchronous-machine starting device with the abnormality detection method changed relative to the synchronous-machine starting device in the first embodiment. Except for the details described below, the device in the present embodiment is similar to the synchronous-machine starting device in the first embodiment.

Figure 6:
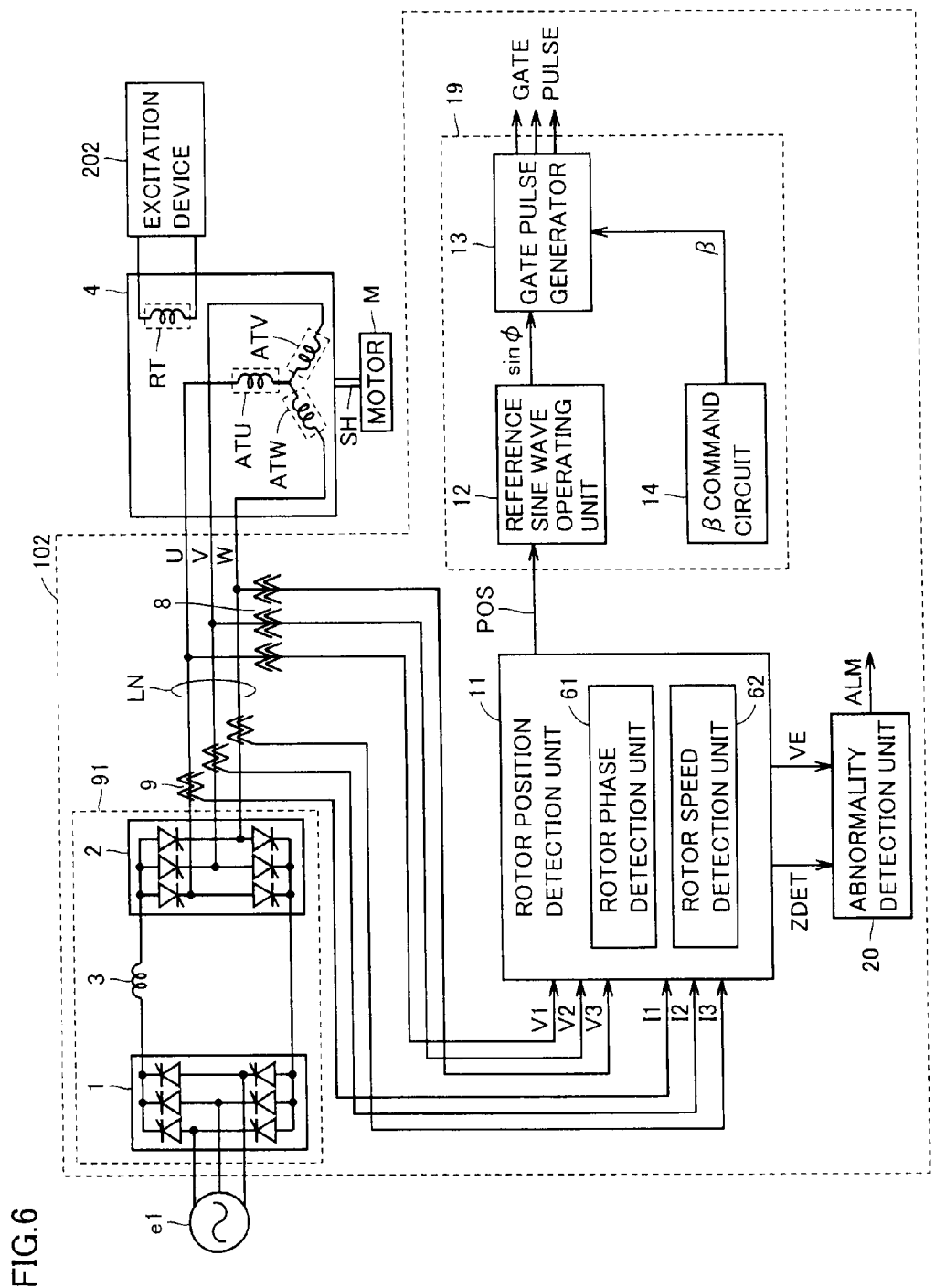
FIG. 6 is a diagram showing in detail a configuration of a synchronous-machine starting device according to a second embodiment of the present invention.

FIG. 6 is a diagram showing in detail a configuration of a synchronous-machine starting device according to a second embodiment of the present invention.

Referring to FIG. 6, a synchronous-machine starting device 102 includes an abnormality detection unit 20 instead of abnormality detection unit 10, relative to the synchronous-machine starting device according to the first embodiment of the present invention.

Abnormality detection unit 20 detects a rotation abnormality of synchronous machine 4 based on the amplitude of AC voltage detected by AC voltage detector 8 after supply of AC power to each armature of synchronous machine 4 by electric power conversion unit 91 is started. More specifically, abnormality detection unit 20 detects a rotation abnormality of synchronous machine 4 based on a detected voltage value VE received from rotor position detection unit 11. For example, abnormality detection unit 20 calculates a root-mean-square value of the AC voltage in each armature of synchronous machine 4 based on detected voltage value VE, and detects a rotation abnormality of synchronous machine 4 based on this root-mean-square value. Here, detected voltage value VE is at least any one of detected values V1, V2. V3, and voltage values Vd and Vq.

At time T3 shown in FIG. 4, abnormality detection unit 20 performs abnormality detection based on the amplitude of the AC voltage in each armature of synchronous machine 4. Specifically, abnormality detection unit 20 detects a rotation abnormality of synchronous machine 4 based on the amplitude of the AC voltage detected by AC voltage detector 8 after a lapse of a predetermined time since the time (time T2) when supply of AC power to each armature of synchronous machine 4 by electric power conversion unit 91 is started.

Figure 7:
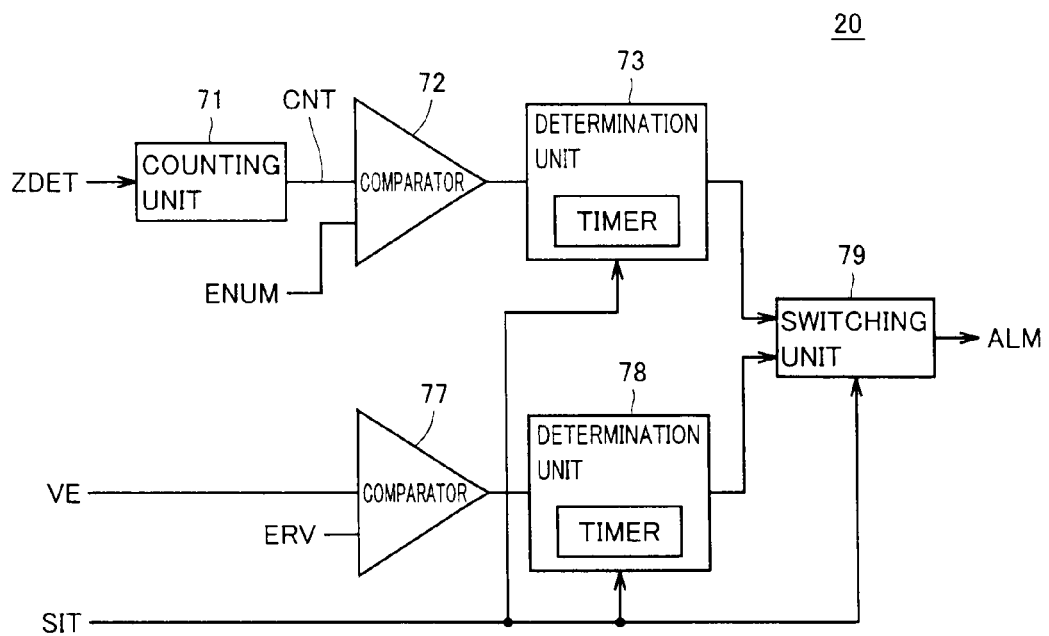
FIG. 7 is a diagram showing a configuration of an abnormality detection unit in a synchronous machine system according to the second embodiment of the present invention.

FIG. 7 is a diagram showing a configuration of the abnormality detection unit in the synchronous machine system according to the second embodiment of the present invention.

Referring to FIG. 7, abnormality detection unit 20 includes counting unit 71, comparator 72, determination unit 73, a comparator 77, a determination unit 78, and a switching unit 79.

Comparator 77 compares detected voltage value VE received from rotor position detection unit 11 with a reference voltage ERV, and when reference voltage ERV is larger, for example, outputs a signal of a logic level indicating that it is abnormal, and when reference voltage ERV is smaller, outputs a signal of a logic level indicating that it is normal.

Determination unit 78 has a timer, and outputs a signal of a logic level indicating that it is normal as a determination signal, irrespective of a signal received from comparator 77, until the time set for this timer lapses (time T3 in FIG. 4) since the time (time T2 in FIG. 4) when control signal SIT indicating the start-up command for synchronous-machine starting device 102 is received from central control device 201. Then, determination unit 78 outputs the signal received from comparator 77 as it is to switching unit 79 as a determination signal after a lapse of the time set for this timer since the time when control signal SIT indicating the start-up command for synchronous-machine starting device 102 is received from central control device 201.

Switching unit 79, for example, outputs the determination signal received from determination unit 73 to central control device 201 before receiving the start-up command for synchronous-machine starting device 102 from central control device 201, and outputs the determination signal received from determination unit 78 to central control device 201 after receiving the start-up command for synchronous-machine starting device 102 from central control device 201.

In synchronous machine 4, in the case of constant field control. i.e., when a constant field current is flown through the field winding of the rotor, the amplitude of AC voltage in each armature of synchronous machine 4 and the rotation frequency of the rotor of synchronous machine 4 are proportional to each other. Utilizing this proportionality, synchronous-machine starting device 102 can determine that synchronous machine 4 has a rotation abnormality in the case where the amplitude of AC voltage in each armature of synchronous machine 4 fails to attain a predetermined value or higher even after a lapse of a predetermined time since synchronous machine 4 is started.

Moreover, the configuration of detecting an abnormality based on rotational speed ω as that of the synchronous-machine starting device according to the first embodiment of the present invention will determine that the rotation of synchronous machine 4 is normal even if, for example, calculation performed by rotor position detection unit 11 diverges so that rotational speed ω attains an excessive value. In contrast, the configuration of detecting a rotation abnormality of synchronous machine 4 based on the amplitude of AC voltage, for example, a root-mean-square value of AC voltage in each armature of synchronous machine 4 allows a rotation abnormality of synchronous machine 4 to be detected even if calculation performed by rotor position detection unit 11 diverges and is no longer performed normally.

However, with the configuration of detecting a rotation abnormality of synchronous machine 4 based on the amplitude in each armature of synchronous machine 4, it is necessary to calculate a root-mean-square value of a detected voltage value of AC voltage detector 8, for example. However, the configuration of detecting an abnormality based on rotational speed ω as that of the synchronous-machine starting device according to the first embodiment of the present invention advantageously avoids such necessity.

Features and operations other than those described above are similar to those of the synchronous-machine starting device according to the first embodiment, and the detailed description will not be repeated here.

It should be construed that embodiments disclosed herein are by way of illustration in all respects, not by way of limitation. It is intended that the scope of the present invention is defined by claims, not by the above description, and encompasses all variations equivalent in meaning and scope to the claims.

REFERENCE SIGNS LIST

1 converter; 2 inverter; 3 DC reactor; 4 synchronous machine; 8 AC voltage detector; 9 AC current detector; 10, 20 abnormality detection unit; 11 rotor position detection unit; 12 reference sine wave operating unit; 13 gate pulse generator; 14 β command circuit; 19 inverter control unit (power conversion control unit); 31, 32 three-to-two phase conversion circuit; 33 induction voltage operating circuit; 34 PLL circuit; 35 position signal generator; 39 zero-cross detection unit (level monitoring unit); 71 counting unit; 72 comparator; 73 determination unit; 74, 79 switching unit; 75, 77 comparator; 76, 78 determination unit; 91 electric power conversion unit; 101 synchronous-machine starting device; 201 central control device; 202 excitation device; 301 synchronous machine system; M motor; TB turbine; SH shaft; ATU, ATV, ATW armature; RT rotor; SWB switch.

The invention claimed is:

1. A synchronous-machine starting device for starting a synchronous machine that includes an armature to generate a rotating magnetic field and a rotor to generate a fixed magnetic field by being supplied with a field current, the synchronous-machine starting device comprising:
   an electric power conversion unit to convert supplied electric power into AC power to supply to the armature of said synchronous machine;
   an AC voltage detection unit to detect an AC voltage in the armature of said synchronous machine;
   a rotor position detection unit to detect a position of said rotor of said synchronous machine based on said AC voltage detected by said AC voltage detection unit;
   an electric power conversion control unit to control said electric power conversion unit based on the position of said rotor detected by said rotor position detection unit; and
   an abnormality detection unit to detect a rotation abnormality of said synchronous machine based on said AC voltage detected by said AC voltage detection unit after a supply of said field current to said rotor of said synchronous machine is started, wherein
   the AC voltage detection unit is to detect first, second, and third AC voltages of respective first, second, and third armatures of said synchronous machine,
   the rotor position detection unit is to detect the position of said rotor of said synchronous machine based on said first, second, and third AC voltages detected by said AC voltage detection unit,
   the rotor position detection unit includes a cross detection unit to perform cross point detection, for each of the first, second and third armatures based on the first, second and third AC voltages, to detect a timing of cross points, the cross points occurring when each of the first, second and third AC voltages attains a predetermined voltage value, and
   the abnormality detection unit is to detect the rotation abnormality of said synchronous machine based on a detection signal from the rotor position detection unit that indicates the cross points.

2. The synchronous-machine starting device according to claim 1, wherein said abnormality detection unit is to detect the rotation abnormality of said synchronous machine based on a number of times the cross points are detected in a whole or part of a period from a time when the supply of said field current to said rotor of said synchronous machine is started to a time when the supply of said AC power to the armature of said synchronous machine by said electric power conversion unit is started.

3. The synchronous-machine starting device according to claim 1, wherein:
based on an estimated phase representing the position of said rotor, an estimated rotational speed of said rotor, and said AC voltage detected by said AC voltage detection unit, said rotor position detection unit is to calculate an error of said estimated phase, and is to calculate said estimated phase and said estimated rotational speed based on said error of the estimated phase, and
said abnormality detection unit is to detect the rotation abnormality of said synchronous machine based on said estimated rotational speed calculated by said rotor position detection unit after a lapse of a predetermined time since a time when the supply of said AC power to the armature of said synchronous machine by said electric power conversion unit is started.

4. The synchronous-machine starting device according to claim 1, wherein said abnormality detection unit is to detect the rotation abnormality of said synchronous machine based on an amplitude of said AC voltage detected by said AC voltage detection unit after a lapse of a predetermined time since a time when supply of said AC power to the armature of said synchronous machine by said electric power conversion unit is started.

5. The synchronous-machine starting device according to claim 1, further comprising:
an AC current detection unit to detect first, second and third AC currents of the respective first, second and third armatures of said synchronous machine, wherein
the rotor position detection unit is to detect the position and calculate a rotational speed of said rotor of said synchronous machine based on said first, second and third AC voltages detected by said AC voltage detection unit and said first, second and third AC currents detected by said AC current detection unit,
the rotor position detection unit is to output the rotational speed of said rotor of said synchronous machine to the abnormality detection unit, and
the abnormality detection unit is to detect the rotation abnormality of said synchronous machine based on the rotational speed output from the rotor position detection unit.

6. The synchronous-machine starting device according to claim 5, wherein:
the abnormality detection unit is to detect the rotation abnormality of said synchronous machine based on the detection signal indicating the cross points during a whole or part of a period from a time T1 when a supply of a field current to the rotor is started to a time T2 when a supply of AC power to each of the armatures of the synchronous machine is started, and
the abnormality detection unit is to detect the rotation abnormality of said synchronous machine based on the rotational speed output from the rotor position detection unit starting at a time T3, which is after a lapse of a predetermined amount since the time T2.

7. The synchronous-machine starting device according to claim 6, wherein the abnormality detection unit is to detect the rotation abnormality of said synchronous machine based on the pulsed detection signal indicating the cross points during a whole or part of a period from the time T1 to the time T3.

8. The synchronous-machine starting device according to claim 6, wherein the abnormality detection unit does not detect the rotation abnormality of said synchronous machine based on the rotational speed prior to the time T3, and the abnormality detection unit does not detect the rotation abnormality of said synchronous machine based on the detection signal indicating the cross points after the time T3.

9. The synchronous-machine starting device according to claim 1, wherein the predetermined voltage value is zero volts.

10. The synchronous-machine starting device according to claim 1, wherein the rotor position detection unit is to output a pulsed detection signal as the detection signal indicating the cross points to the abnormality detection unit.

11. A synchronous-machine starting device for starting a synchronous machine that includes an armature to generate a rotating magnetic field and a rotor to generate a fixed magnetic field by being supplied with a field current, the synchronous-machine starting device comprising:
electric power conversion means for converting supplied electric power into AC power to supply to the armature of said synchronous machine;
AC voltage detection means for detecting an AC voltage in the armature of said synchronous machine;
rotor position detection means for detecting a position of said rotor of said synchronous machine based on said AC voltage detected by said AC voltage detection means;
electric power conversion control means for controlling said electric power conversion means based on the position of said rotor detected by said rotor position detection means; and
abnormality detection means for detecting a rotation abnormality of said synchronous machine based on said AC voltage detected by said AC voltage detection means after a supply of said field current to said rotor of said synchronous machine is started, wherein
the AC voltage detection means detects first, second, and third AC voltages of respective first, second, and third armatures of said synchronous machine,
the rotor position detection means detects the position of said rotor of said synchronous machine based on said first, second, and third AC voltages detected by said AC voltage detection means,
the rotor position detection means includes cross detection means for detecting, for each of the first, second and third armatures based on the first, second and third AC voltages, a timing of cross points, the cross points occurring when each of the first, second and third AC voltages attains a predetermined voltage value, and
the abnormality detection means detects the rotation abnormality of said synchronous machine based on a detection signal from the rotor position detection means that indicates the cross points.

\* \* \* \* \*